US008389172B2

(12) United States Patent
Homma

(10) Patent No.: US 8,389,172 B2
(45) Date of Patent: Mar. 5, 2013

(54) FUEL CELL SYSTEM

(75) Inventor: Hiroki Homma, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 574 days.

(21) Appl. No.: 12/301,285

(22) PCT Filed: May 16, 2007

(86) PCT No.: PCT/JP2007/060476
§ 371 (c)(1),
(2), (4) Date: Nov. 18, 2008

(87) PCT Pub. No.: WO2007/136080
PCT Pub. Date: Nov. 29, 2007

(65) Prior Publication Data
US 2009/0263689 A1   Oct. 22, 2009

(30) Foreign Application Priority Data

May 18, 2006   (JP) ................................ 2006-138611

(51) Int. Cl.
*H01M 8/04*   (2006.01)
*H01M 8/24*   (2006.01)

(52) U.S. Cl. ........ 429/441; 429/433; 429/434; 429/436; 429/452

(58) Field of Classification Search .......... 429/434–436, 429/440–442
See application file for complete search history.

(56) References Cited

U.S. PATENT DOCUMENTS

| 5,998,053 | A  | * | 12/1999 | Diethelm ...................... 429/429 |
| 6,998,096 | B2 | * | 2/2006 | Ishikawa ........................... 48/94 |
| 2002/0006535 | A1 | * | 1/2002 | Woods et al. .................. 429/17 |
| 2004/0146763 | A1 |   | 7/2004 | Pondo et al. |
| 2006/0134476 | A1 | * | 6/2006 | Tsunoda et al. ................ 429/20 |

FOREIGN PATENT DOCUMENTS

| DE | 19852853 A1 | 7/1999 |
| JP | 2005-166439 | 6/2005 |

* cited by examiner

*Primary Examiner* — Barbara Gilliam
*Assistant Examiner* — Robert S Carrico
(74) *Attorney, Agent, or Firm* — Nelson Mullins Riley & Scarborough LLP; Anthony A. Laurentano

(57) ABSTRACT

A fuel cell system includes a fuel cell stack, a heat exchanger, a reformer, and a combustor. A combustion gas path for supplying the combustion gas produced in the combustor to the heat exchanger as the heat medium is provided. The combustion gas path is provided between a space of dual walls comprising a first inner plate and a second inner plate and a first case unit and a second case unit accommodating a load applying mechanism and the fuel cell stack.

6 Claims, 7 Drawing Sheets

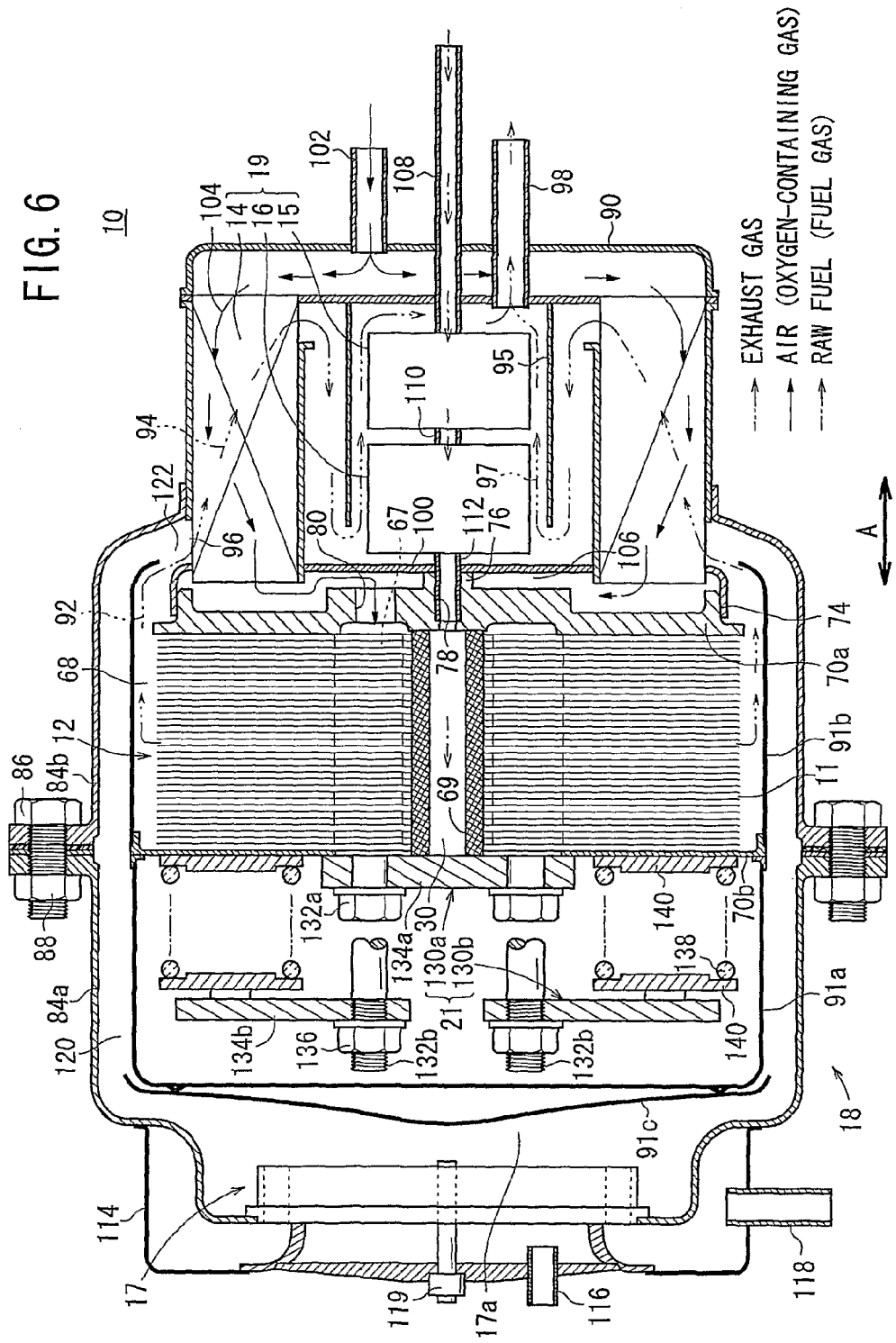

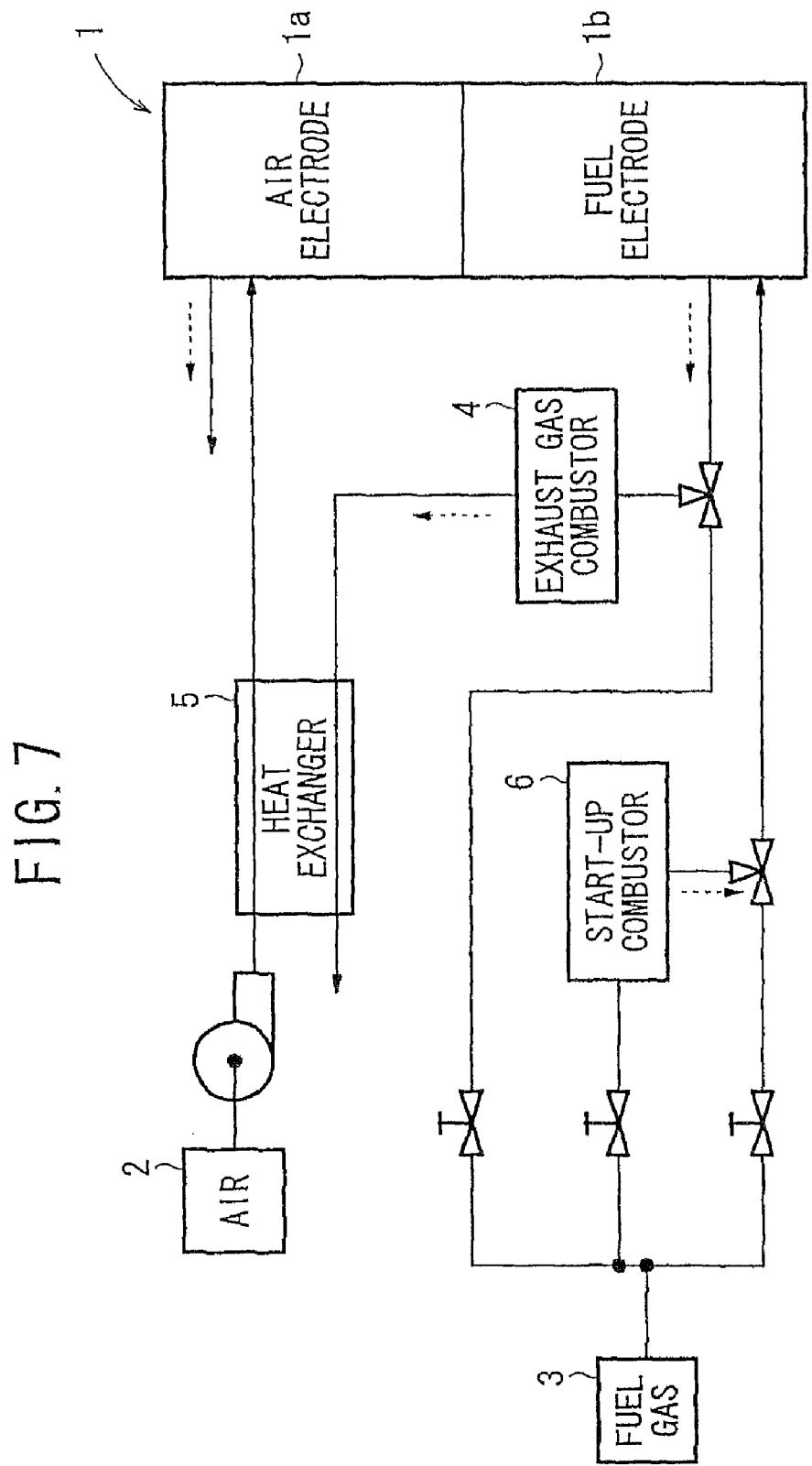

US 8,389,172 B2

FUEL CELL SYSTEM

RELATED APPLICATIONS

This application is a 35 U.S.C. 371 national stage filing of International Application No. PCT/JP2007/060476, filed 16 May 2007, which claims priority to Japan Patent Application No. 2006-138611 filed on 18 May 2006 in Japan. The contents of the aforementioned applications are hereby incorporated by reference.

TECHNICAL FIELD

The present invention relates to a fuel cell system including a fuel cell stack formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (membrane electrode assembly). The electrolyte electrode assembly is interposed between separators (bipolar plates). In use, generally, predetermined numbers of the electrolyte electrode assemblies and the separators are stacked together to form a fuel cell stack.

In the fuel cell stack, the operating temperature of the fuel cell is high, about 800° C. Therefore, at the time of starting operation of the fuel cell stack, it is desirable to heat the fuel cell stack to a desired temperature rapidly using a combustor. Normally, the combustor is provided on a side of the fuel cell stack where the oxygen-containing gas is supplied, or on a side of the fuel cell stack where the exhaust gas is discharged.

However, in the structure where the combustor is provided on the side where the oxygen-containing gas is supplied, the hot combustion gas produced by combustion in the combustor directly flows into the fuel cell stack. Therefore, the separators tend to be corroded easily by the hot combustion gas, and carbon in the combustion gas adheres to the separators or the membrane electrode assembly.

In an attempt to address the problems, structure of providing the combustor on the side of the fuel stack where the exhaust gas is discharged may be adopted. For example, Japanese Laid-Open Patent Publication No. 2005-166439 discloses a fuel cell system as shown in FIG. 7. The fuel cell system includes a fuel cell 1 having an air electrode 1a and a fuel electrode 1b. The air 2 as an oxygen-containing gas is supplied to the air electrode 1a, and a fuel gas 3 is supplied to the fuel electrode 1b.

On the side of the fuel cell 1 where the off gas is discharged from the fuel electrode 1b, an exhaust gas combustor 4 for burning the off gas is provided, and the combustion gas discharged from the exhaust gas combustor 4 is supplied to a heat exchanger 5, and the air 2 is heated before it is supplied to the air electrode 1a. In a supply line of the fuel gas 3, a start up combustor 6 for supplying the reducing gas produced during the system start-up by incomplete combustion to the fuel electrode 1b is provided.

However, in the conventional technique, since the two combustors, i.e., the exhaust gas combustor 4 and the start up combustor 6 are provided in the fuel cell system, the overall size of the fuel cell system is large. Further, the exhaust gas combustor 4 is provided in the exhaust gas path of the fuel cell 1, and always exposed to the hot exhaust gas. Thus, durability of the exhaust gas combustor 4 is lowered. Further, at the time of starting operation of the fuel cell system, because the temperature of the exhaust gas discharged from the fuel cell fluctuates, it is extremely difficult to maintain the temperature of the exhaust combustion gas discharged from the exhaust gas combustor 4 in a certain range of the temperature.

DISCLOSURE OF INVENTION

The present invention solves the above problems, and an object of the present invention is to provide a fuel cell system having simple structure in which durability of the combustor is improved effectively, and heat efficiency is improved suitably.

The present invention relates to a fuel cell system comprising a fuel cell stack, a heat exchanger, a reformer, and a combustor. The fuel cell stack is formed by stacking a plurality of fuel cells in a stacking direction. Each of the fuel cells is formed by stacking an electrolyte electrode assembly and a separator. The electrolyte electrode assembly includes an anode, a cathode, and an electrolyte interposed between the anode and the cathode. The heat exchanger heats an oxygen-containing gas using a heat medium before the oxygen-containing gas is supplied to the fuel cell stack. The reformer reforms a raw fuel chiefly containing hydrocarbon to produce a fuel gas to be supplied to the fuel cell stack. The combustor burns the raw fuel to produce a combustion gas.

A fluid unit including at least the heat exchanger and the reformer is provided at one end of the fuel cell stack in the stacking direction, and the combustor is provided at the other end of the fuel cell stack in the stacking direction. The fuel cell system includes a combustion gas path for supplying the combustion gas produced in the combustor to the heat exchanger as the heat medium. The combustion gas path is provided in a space between dual walls comprising an inner wall and an outer wall accommodating the fuel cell stack.

According to the present invention, the combustion gas produced in the combustor flows through the combustion gas path formed in the space between the inner wall and the outer wall accommodating the fuel cell stack. Then, the combustion gas is supplied from the combustion gas path to the heat exchanger. In the structure, the fuel cell stack is heated from the outside by the hot combustion gas, and heated from the inside by the air which has been used in the heat exchange with the combustion gas at the heat exchanger. Thus, heat radiation from the fuel cell stack is suitably prevented. The fuel cell stack is heated uniformly and rapidly. Accordingly, it is possible to easily start suitable operation of the fuel cell stack.

BRIEF DESCRIPTION OF DRAWINGS

FIG. 6 is a view showing a state where steady operation of the fuel cell system is performed; and FIG. 7 is a diagram showing a fuel cell system according to Japanese Laid-Open Patent Publication No. 2005-166439.

BEST MODE FOR CARRYING OUT THE INVENTION

Figure 1:
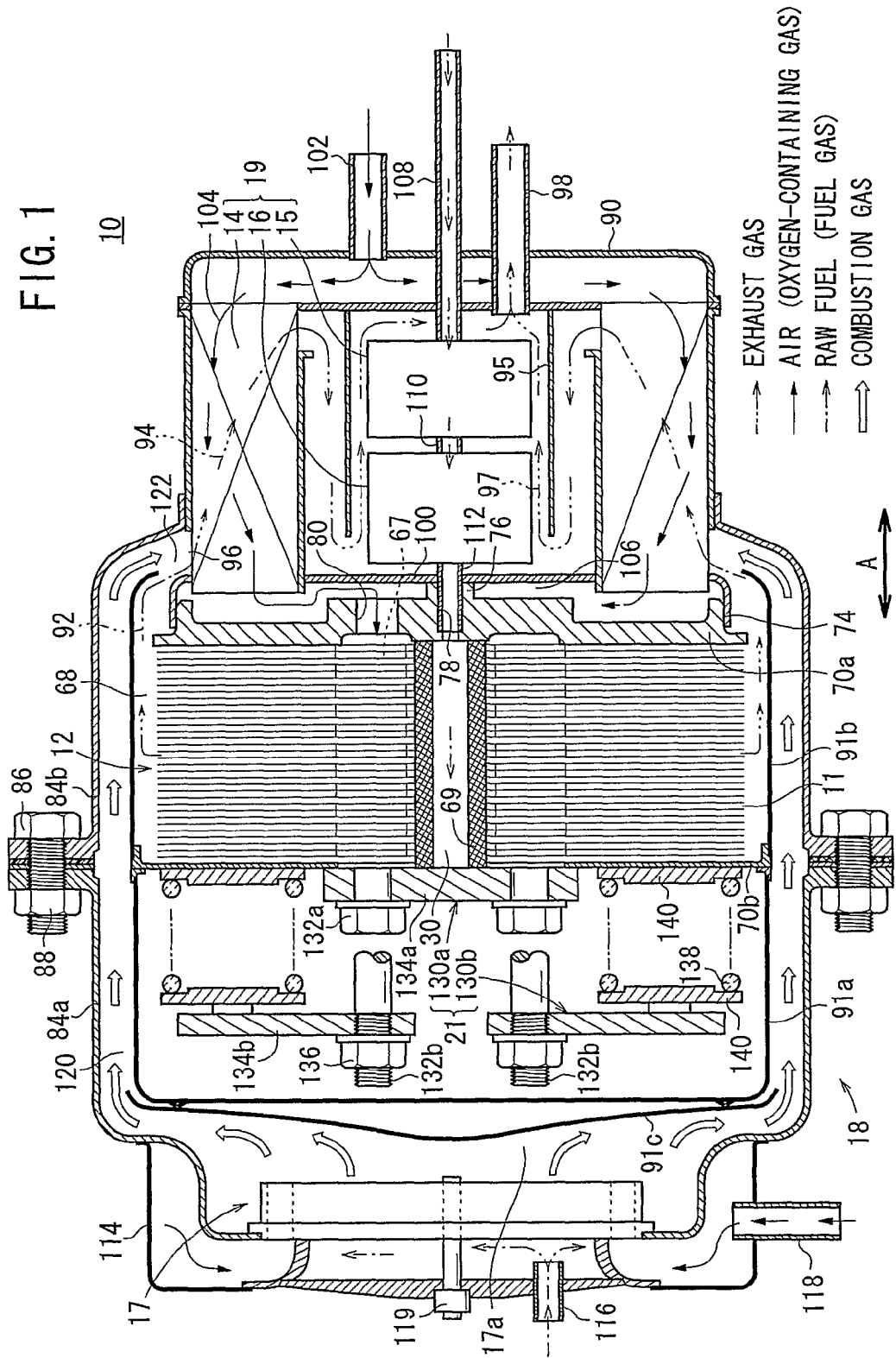
FIG. 1 is a partial cross sectional view showing a fuel cell system according to an embodiment of the present invention.
Figure 2:
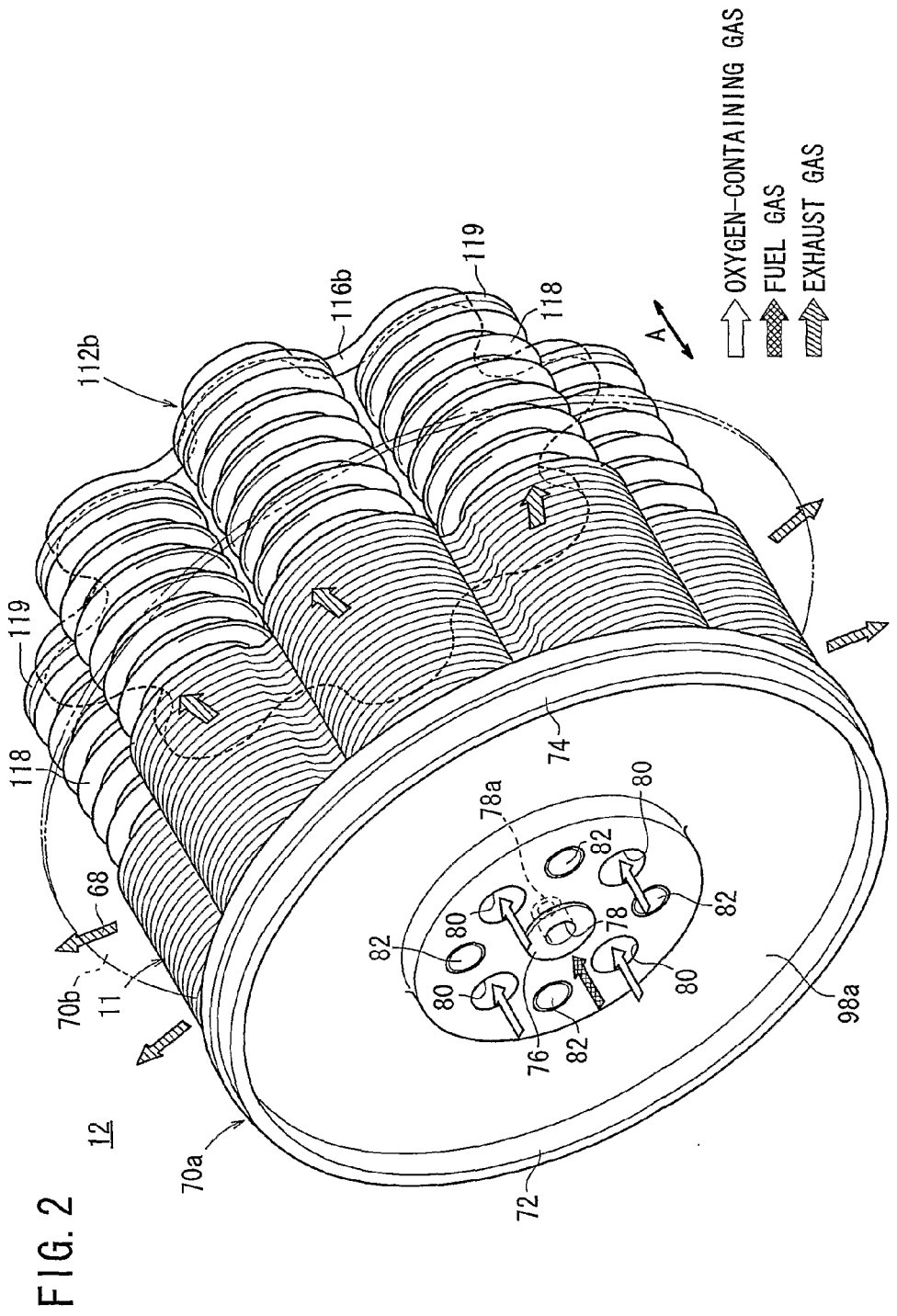
FIG. 2 is a perspective view schematically showing a fuel cell stack of the fuel cell system.

FIG. 1 is a partial cross sectional view showing a fuel cell system 10 according to an embodiment of the present invention. FIG. 2 is a perspective view schematically showing a fuel cell stack 12 formed by stacking a plurality of fuel cells 11 of the fuel cell system 10 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes a fuel cell stack 12, a heat exchanger 14, an evaporator 15, a reformer (or preliminary reformer) 16, a combustor 17, and a casing 18. The heat exchanger 14 heats an oxygen-containing gas before it is supplied to the fuel cell stack 12. The evaporator 15 evaporates water. The reformer 16 uses water vapor (steam) and a raw fuel (e.g., city gas) chiefly containing hydrocarbon for steam reforming of the raw fuel. The combustor 17 burns the raw fuel to produce a combustion gas. The fuel cell stack 12, the heat exchanger 14, the evaporator 15, the reformer 16, and the combustor 17 are disposed in the casing 18.

In the casing 18, a fluid unit 19 at least including the heat exchanger 14 and the reformer 16 is provided on one side of the fuel cell stack 12, and a load applying mechanism 21 for applying a tightening load to the fuel cells 11 in the stacking direction indicated by the arrow A, and the combustor 17 are provided on the other side of the fuel cell stack 12. The fluid unit 19 and the load applying mechanism 21 are provided symmetrically with respect to the central axis of the fuel cell stack 12.

In the fluid unit 19, the substantially cylindrical reformer 16 and the evaporator 15 are provided inside the ring shaped heat exchanger 14, near the fuel cell stack 12. The reformer 16 and the evaporator 15 are provided adjacent to each other in the direction indicated by the arrow A.

Figure 3:
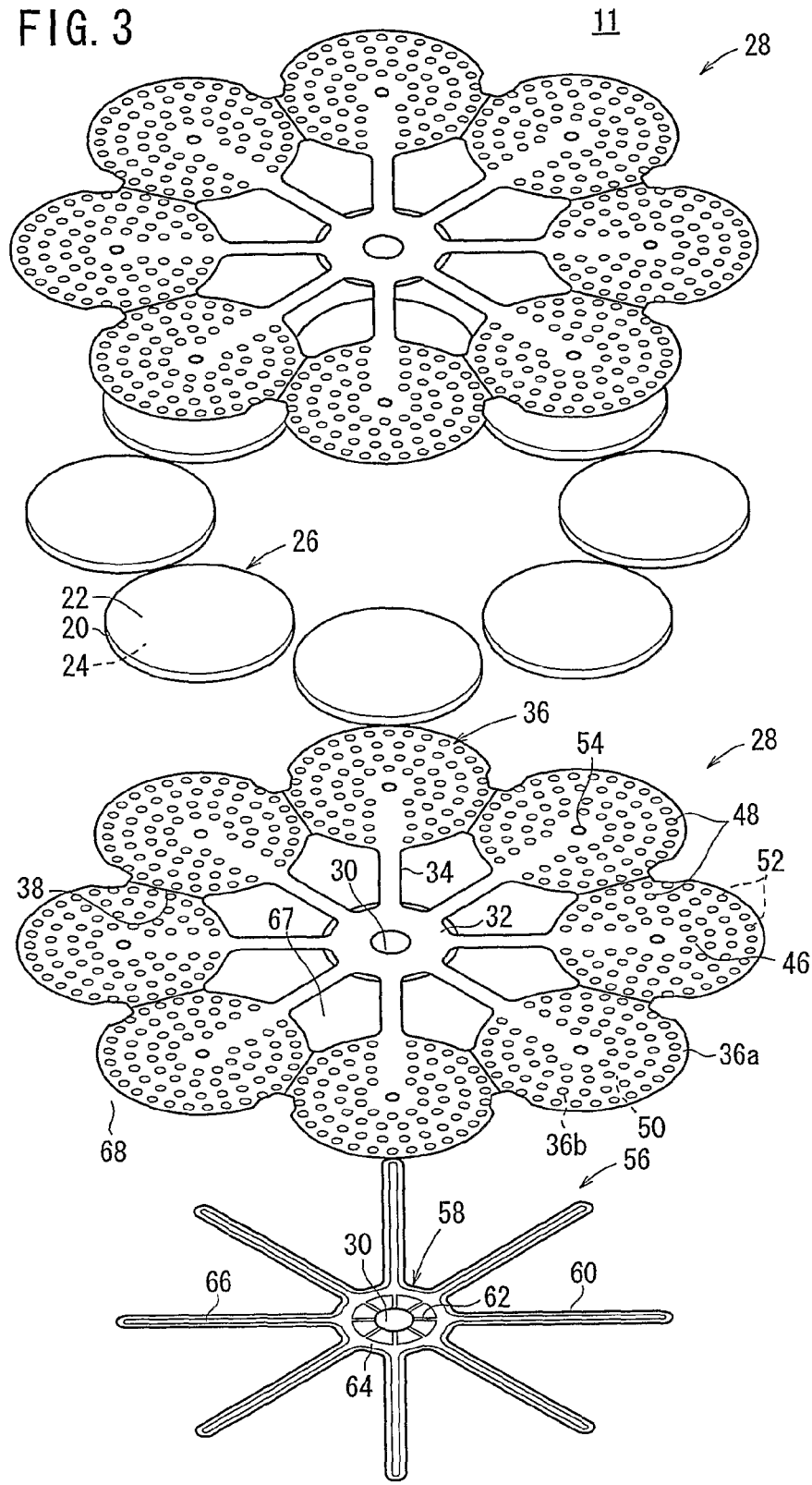
FIG. 3 is an exploded perspective view showing a fuel cell of the fuel cell stack.

The fuel cell 11 is a solid oxide fuel cell (SOFC). As shown in FIG. 3, the fuel cell 11 includes electrolyte electrode assemblies 26 each having a circular disk shape. Each of the electrolyte electrode assemblies 26 includes a cathode 22, an anode 24, and an electrolyte (electrolyte plate) 20 interposed between the cathode 22 and the anode 24. A barrier layer (not shown) is provided at least at the inner circumferential edge of the electrolyte electrode assembly 26 (center of the separator 28) for preventing the entry of the oxygen-containing gas. For example, the electrolyte 20 is made of ion-conductive solid oxide such as stabilized zirconia.

A plurality of, e.g., eight electrolyte electrode assemblies 26 are sandwiched between a pair of separators 28 to form the fuel cell 11. The eight electrolyte electrode assemblies 26 are aligned along a virtual circle concentric with a fuel gas supply passage 30 extending through the center of the separators 28.

For example, each of the separators 28 comprises a single metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals).

The circular disk 36 and the electrolyte electrode assembly 26 have substantially the same size. The adjacent circular disks 36 are separated by a slit 38.

Each of the circular disks 36 has first protrusions 48 on its surface 36a which contacts the anode 24. The first protrusions 48 form a fuel gas channel 46 for supplying the fuel gas along an electrode surface of the anode 24. Further, each of the circular disks 36 has second protrusions 52 on its surface 36b which contacts the cathode 22. The second protrusions 52 form an oxygen-containing gas channel 50 for supplying the oxygen-containing gas along an electrode surface of the cathode 22.

Figure 4:
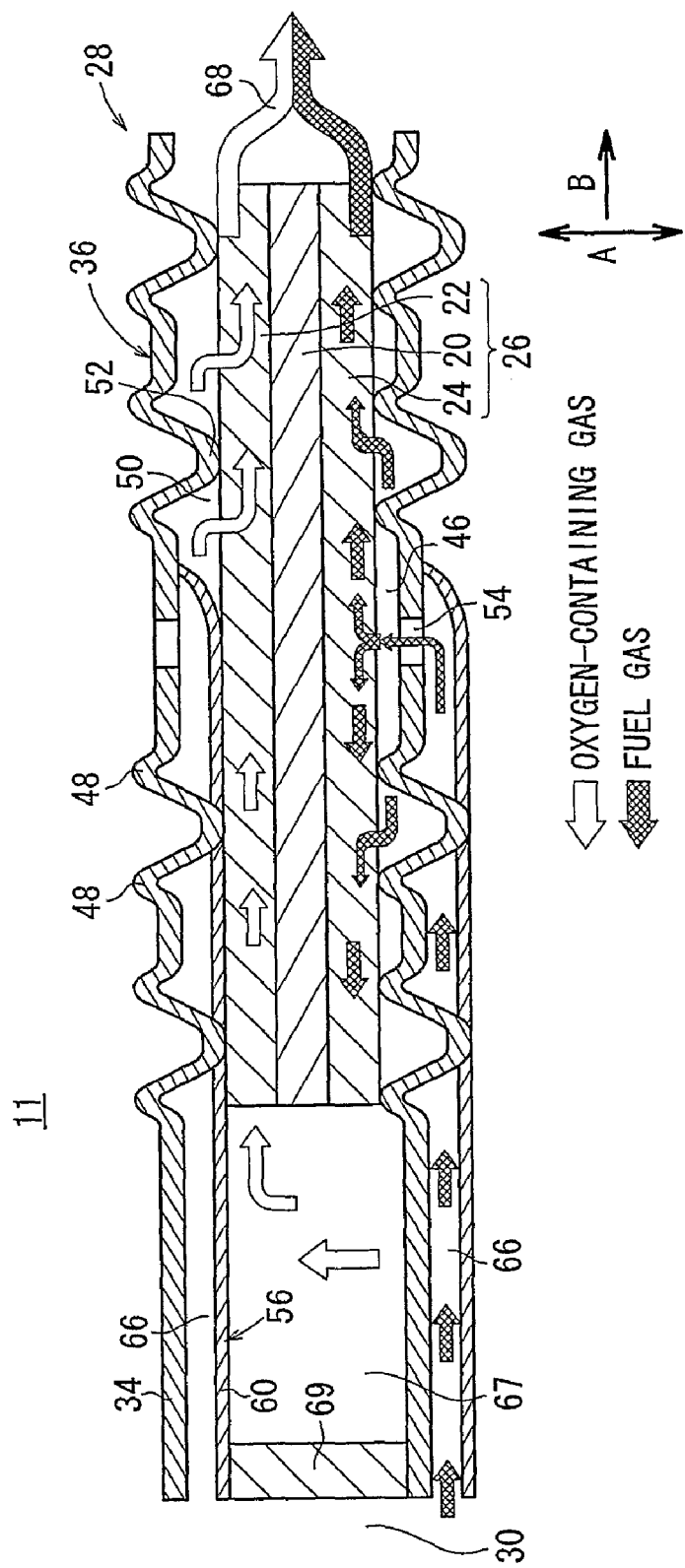
FIG. 4 is a cross sectional view schematically showing operation of the fuel cell.

As shown in FIG. 4, the first and second protrusions 48, 52 protrude in opposite directions. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

As shown in FIGS. 3 and 4, a fuel gas inlet 54 is provided in each of the circular disks 36 for supplying the fuel gas to the fuel gas channel 46. The position of the fuel gas inlet 54 is determined such that uniform distribution of the fuel gas is achieved. For example, the fuel gas inlet 54 is positioned at substantially the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. A fuel gas supply channel 66 is formed between the first and second bridges 34, 60. The fuel gas supply channel 66 is connected from the fuel gas supply passage 30 to the fuel gas channel 46 via the slits 62 and the recess 64 through the fuel gas inlet 54.

As shown in FIG. 4, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 extends in the stacking direction inside the circular disks 36 between the first bridges 34.

An insulating seal 69 for sealing the fuel gas supply passage 30 is provided between a pair of separators 28. For example, the insulating seal 69 is made of mica material, or ceramic material. An exhaust gas channel 68 is formed around the circular disks 36 of the fuel cells 11.

As shown in FIGS. 1 and 2, the fuel cell stack 12 includes a plurality of the fuel cells 11 stacked together, and end plates 70a, 70b provided at opposite ends in the stacking direction. Each of the end plates 70a, 70b has a substantially circular disk shape. A ring shaped portion 72 protrudes from the outer circumferential end of the end plate 70a, and a groove 74 is formed around the ring shaped portion 72. A columnar projection 76 is formed at the center of the ring shaped portion 72. The columnar projection 76 protrudes in the same direction as the ring shaped portion 72. A stepped hole 78 is formed at the center of the projection 76.

Holes 80 and screw holes 82 are formed in a same virtual circle around the projection 76. The holes 80 and the screw holes 82 are arranged alternately, and spaced at predetermined angles (intervals). As shown in FIG. 1, the diameter of the end plate 70b is larger than the diameter of the end plate 70a.

The casing 18 includes a first case unit 84a accommodating the load applying mechanism 21 and the combustor 17 and a second case unit 84b accommodating the fuel cell stack 12. The end plate 70b and an insulating member are sandwiched between the first case unit 84a and the second case unit 84b. The insulating member is provided on the side of the second case unit 84b. The joint portion between the first case unit 84a and the second case unit 84b is tightened by screws 86 and nuts 88. A head plate 90 is fixed to the second case unit 84b through the heat exchanger 14.

A first inner plate 91a for heat insulation and a second inner plate 91b for heat insulation are provided in the casing 18. The first inner plate 91a has a cylindrical shape having a bottom, and is provided around the load applying mechanism 21 as described later. The second inner plate 91b has a cylindrical shape, and is provided around the fuel cell stack 12. The first inner plate 91a and the second inner plate 91b as inner walls, and the first case unit 84a and the second case unit 84b as outer walls form dual walls. The thickness of the first inner plate 91a and the second inner plate 91b is smaller than the thickness of the first case unit 84a and the second case unit 84b. A third inner plate 91c for heat insulation is provided on the first inner plate 91a. The central part of the third inner plate 91c is expanded toward the combustor 17.

The exhaust gas channel 68 is provided between the outer ends of the stacked fuel cells 11 and the second inner plate 91b. The exhaust gas channel 68 is connected to an exhaust gas path 92, and the exhaust gas path 92 is connected to a heat medium inlet 96 for supplying a heat medium to a heat medium channel 94 of the heat exchanger 14. The heat medium channel 94 is connected to an exhaust gas pipe 98 through a heating channel 97 formed by a guide plate 95. The exhaust gas pipe 98 is attached to the head plate 90.

The guide plate 95 is provided around the evaporator 15 and the reformer 16. The heating channel 97 for heating the evaporator 15 and the reformer 16 is provided inside the guide plate 95. The heat exchanger 14 is fixed to the end plate 70a through the wall plate 100.

An air supply pipe 102 is attached to the head plate 90. The air supply pipe 102 is connected to a chamber 106 formed inside the wall plate 100 through the channel 104 in the heat exchanger 14. The chamber 106 is connected to the oxygen-containing gas supply unit 67 in the fuel cell stack 12 through the holes 80 of the end plate 70a.

A raw fuel supply pipe 108 is connected to the evaporator 15. The raw fuel supply pipe 108 extends to the outside of the head plate 90. The evaporator 15 and the reformer 16 are connected through a connection pipe 110. The reformer 16 has a reformed gas supply pipe 112. The reformed gas supply pipe 112 is inserted into a stepped hole 78 of the end plate 70a, and connected to the fuel gas supply passage 30.

The combustor 17 has a casing 114, and the thickness of the casing 114 is small in comparison with the first case unit 84a. The casing 114 is formed in a substantially ring shape around the end of the first case unit 84a. A raw fuel supply pipe 116 and an air supply pipe 118 are connected to the casing 114. The raw fuel supply pipe 116 and the air supply pipe 118 extend through the casing 114, and are exposed to the outside.

The casing 114 has an ignition plug 119. Combustion is performed using the raw fuel and the air supplied to the combustion chamber 17a.

The combustor 17 has a combustion gas path 120 for supplying a combustion gas produced in the combustion chamber 17a of the combustor 17 to the heat exchanger 14. The combustion gas path 120 is provided in the space between the dual walls formed by the first inner plate 91a, the second inner plate 91b, the first case unit 84a and the second case unit 84b. The combustion gas path 120 and the exhaust gas path 92 are merged at a merger section 122 on the upstream side of the heat medium inlet 96 of the heat exchanger 14.

The load applying mechanism 21 includes a first tightening unit 130a for applying a first tightening load to a region around (near) the fuel gas supply passage 30 and a second tightening unit 130b for applying a second tightening load to the electrolyte electrode assemblies 26. The second tightening load is smaller than the first tightening load.

The first tightening unit 130a includes short first tightening bolts 132a screwed into screw holes 82 formed along one diagonal line of the end plate 70a. The first tightening bolts 132a extend in the stacking direction of the fuel cells 11, and engage a first presser plate 134a. The first tightening bolts 132a are provided in the oxygen-containing gas supply unit 67 extending through the separators 28. The first presser plate 134a is a narrow plate, and engages the central position of the separator 28 to cover the fuel gas supply passage 30.

The second tightening unit 130b includes long second tightening bolts 132b screwed into screw holes 82 formed along the other diagonal line of the end plate 70a. Ends of the second tightening bolts 132b extend through a second presser plate 134b having a curved outer section. Nuts 136 are fitted to the ends of the second tightening bolts 132b. The second tightening bolts 132b are provided in the oxygen-containing gas supply unit 67 extending through the separators 28. Springs 138 and spring seats 140 are provided in respective circular portions of the second presser plate 134b, at positions corresponding to the electrolyte electrode assemblies 26 on the circular disks 36 of the fuel cell 11. For example, the springs 138 are ceramics springs.

Next, operation of the fuel cell system 10 will be described below.

Figure 5:
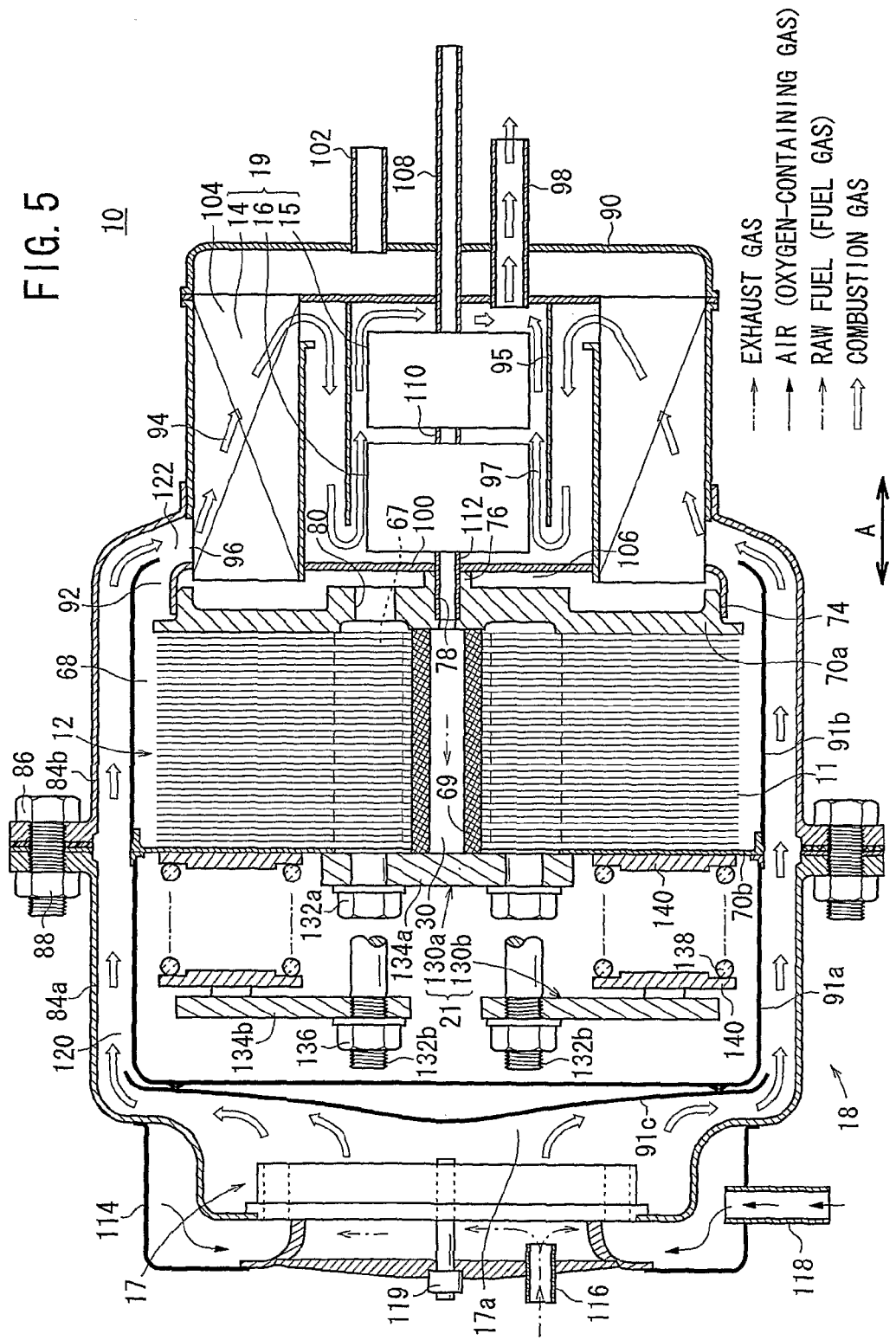
FIG. 5 is a view showing a state of starting operation of the fuel cell system.

Firstly, at the time of starting operation of the fuel cell system 10, combustion by the combustor 17 is started, and then, operation of the fuel cell stack 12 is started. Specifically, as shown in FIG. 5, a raw fuel is supplied to the raw fuel supply pipe 116, and the air is supplied to the air supply pipe 118. Therefore, the combustion gas produced by combustion in the combustion chamber 17a flows through the combustion gas path 120, and heats the fuel cell stack 12 from the outside. Then, the combustion gas flows through the merger section 122, and the combustion gas is supplied to the heat medium channel 94 of the heat exchanger 14.

The combustion gas flows through the heat exchanger 14, and then, the combustion gas flows into the heating channel 97 by the guidance of the guide plate 95. The reformer 16 and the evaporator 15 are provided in the heating channel 97. After the combustion gas heats the reformer 16 and the evaporator 15, the combustion gas is discharged from the exhaust gas pipe 98 to the outside.

Then, after the fuel cell stack 12, the heat exchanger 14, the reformer 16 and the evaporator 15 are heated to predetermined temperatures, as shown in FIG. 1, the raw fuel (methane, ethane, or propane) and water are supplied to the raw fuel supply pipe 108. Further, the oxygen-containing gas (hereinafter also referred to as the air) is supplied to the air supply pipe 102 to start operation of the fuel cell stack 12.

Thus, in the evaporator 15, water is evaporated to produce water vapor. The water vapor and the raw fuel flow through the connection pipe 110, and are supplied to the reformer 16. Thus, at the reformer 16, the fuel gas is produced by steam reforming of the raw fuel. The fuel gas flows through the reformed gas supply pipe 112, and is supplied to the fuel gas supply passage 30 of the fuel cell stack 12. Then, the fuel gas moves in the stacking direction indicated by the arrow A, and flows into the fuel gas supply channel 66 of each fuel cell 11 (see FIG. 4).

The fuel gas flows along the fuel gas supply channel 66 between the first and second bridges 34, 60, and flows into the fuel gas channels 46 from the fuel gas inlets 54 of the circular disks 36. The fuel gas inlets 54 are formed at substantially the central positions of the anodes 24 of the electrolyte electrode assemblies 26. Thus, in each of the electrolyte electrode assemblies 26, the fuel gas is supplied from the fuel gas inlet 54 to substantially the central position of the anode 24, and flows outwardly toward the outer end of the anode 24 along the fuel gas channel 46.

As shown in FIG. 1, the air from the air supply pipe 102 flows through the channel 104 of the heat exchanger 14, and flows temporarily into the chamber 106. Then, the air flows through the holes 80 connected to the chamber 106, and is supplied to the oxygen-containing gas supply unit 67 provided at substantially the center of each fuel cell 11. In the heat exchanger 14, as described later, a mixed gas of the exhaust gas discharged to the exhaust gas channel 68 and the hot combustion gas heated by the combustor 17 flow through the heat medium channel 94.

Therefore, in the heat exchanger 14, heat exchange between the mixed gas of the exhaust gas and the combustion gas merged at the merger section 122 and the air before consumption is performed. The air is heated to a predetermined fuel cell operating temperature before it is supplied to the fuel cells 11.

The air supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 4, in the oxygen-containing gas channel 50, the oxygen-containing gas flows from the inner circumferential edge (central region of the separator 28) to the other outer circumferential edge (outer circumferential region of the separator 28) of, i.e., from one end to the other end of the cathode 22 of the electrolyte electrode assembly 26.

Thus, in the electrolyte electrode assembly 26, the fuel gas flows from the center to the outer circumferential side on the electrode surface of the anode 24, and the air flows in one direction indicated by the arrow B on the electrode surface of the cathode 22. At this time, oxygen ions flow through the electrolyte 20 toward the anode 24 for generating electricity by electrochemical reactions. The fuel gas from the fuel gas channel 46 after consumption and the air from the oxygen-containing gas channel 50 after consumption are discharged into the exhaust gas channel 68 to produce the hot exhaust gas.

Then, after the fuel cell stack 12 starts the steady operation, combustion by the combustor 17 is stopped. Thus, as shown in FIG. 6, at the heat exchanger 14, heat exchange between the air supplied from the air supply pipe 102 before reaction and the exhaust gas discharged from the fuel cell stack 12 is performed. After the oxygen-containing gas is heated to the predetermined temperature, the oxygen-containing gas is supplied to the fuel cell stack 12.

In the embodiment, the combustion gas path 120 for supplying the combustion gas produced in the combustor 17 to the heat exchanger 14 as the heat medium is provided. The combustion gas path 120 is provided in the space between the dual walls formed by the first inner plates 91a and the second inner plate 91b as the inner walls, and the first case unit 84a and the second case unit 84b as the outer walls, accommodating the load applying mechanism 21 and the fuel cell stack 12.

In the structure, the fuel cell stack 12 is heated from the outside by the hot combustion gas, and heat insulating performance of the fuel cell stack 12 is improved effectively. Thus, the amount of heat radiated from the fuel cell stack 12 is reduced, and heat efficiency is improved. In particular, it is possible to start operation of the fuel cell stack 12 suitably.

Further, the fuel cell stack 12 is heated from the inside by the air which has been subjected to heat exchange with the combustion gas at the heat exchanger 14. In the structure, it is possible to supply the hot air to the fuel cell stack 12 without directly exposing the fuel cell stack 12 to the exhaust gas from the combustor 17. Therefore, corrosion is prevented, and the fuel cell stack 12 is heated uniformly and rapidly.

Further, the exhaust gas discharged from the fuel cell stack 12 is supplied from the exhaust gas channel 68 to the exhaust gas path 92, and the combustion gas discharged from the combustor 17 is supplied to the combustion gas path 120. The exhaust gas path 92 and the combustion gas path 120 are merged at the merger section 122 provided on the upstream side of the heat medium inlet 96 of the heat exchanger 14.

In the structure, the combustion gas produced in the combustor 17 and the exhaust gas discharged from the fuel cell stack 12 are mixed at the merger section 122, and then supplied from the heat medium inlet 96 to the heat medium channel 94 of the heat exchanger 14. Therefore, the temperature of the heat medium supplied to the heat exchanger 14 is regulated suitably and accurately, and the combustor 17 is controlled simply and finely at once. Further, durability of the heat exchanger 14 is improved, and the heat exchanger 14 can be designed freely.

Further, the combustor 17 is not exposed to the hot exhaust gas discharged from the fuel cell stack 12, and durability of the combustor 17 is improved advantageously. Moreover, the raw fuel is supplied to the combustor 17 through the raw fuel supply pipe 116, and the air is supplied to the combustor 17 through the air supply pipe 118. The temperatures and the flow rates of the raw fuel and the oxygen-containing gas as the conditions of operating the fuel cell stack 12 can be maintained substantially at certain levels. Accordingly, stable combustion is performed reliably.

The exhaust gas (including the combustion gas) which has been subjected to the heat exchange when it passes through the heat medium channel 94 is supplied to the heating channel 97 by the guidance of the guide plate 95. The reformer 16 and the evaporator 15 are provided in the heating channel 97. By the heat of the exhaust gas, the reformer 16 and the evaporator 15 are heated suitably. The hot exhaust gas flows through the heat exchanger 14 such that the temperature of the exhaust gas is lowered to a relatively low temperature suitable for heating the reformer 16. In this manner, the waste heat is utilized suitably, and heat efficiency is improved.

The invention claimed is:
1. A fuel cell system comprising:
a fuel cell stack formed by stacking a plurality of fuel cells in a stacking direction, said fuel cells each being formed by stacking an electrolyte electrode assembly and a separator, said electrolyte electrode assembly including an anode, a cathode, and an electrolyte interposed between said anode and said cathode;

a heat exchanger for heating an oxygen-containing gas using a heat medium before the oxygen-containing gas is supplied to said fuel cell stack;

a reformer for reforming a raw fuel chiefly containing hydrocarbon to produce a fuel gas to be supplied to said fuel cell stack;

a combustor for burning the raw fuel to produce a combustion gas, wherein a fluid unit including at least said heat exchanger and said reformer is provided at one end of said fuel cell stack in the stacking direction, and said combustor is provided at an opposite end of the fuel cell stack in the stacking direction;

a combustion gas path for supplying the combustion gas produced in said combustor to said heat exchanger as the heat medium;

said combustion gas path is provided in a space between an inner wall and an outer wall of a dual wall structure, the dual wall structure accommodating said fuel cell stack therein, an exhaust gas path, separate from the combustion path, formed between the fuel cell and the inner wall of the dual wall structure such that the combustion path and the exhaust gas path are formed on opposite sides of the inner wall, the exhaust path supplying an exhaust gas discharged from said fuel cell stack to said heat exchanger as the heat medium; and a merger section for merging said combustion gas path and said exhaust gas path, said merger section being provided downstream from the combustion gas path and the exhaust gas path, on an upstream side of a heat medium inlet for supplying the heat medium to said heat exchanger.

2. A fuel cell system according to claim 1, wherein said fluid unit further comprises an evaporator for evaporating water to produce a mixed fuel containing the raw fuel and water vapor.

3. A fuel cell system according to claim 2, wherein said reformer is provided inside said heat exchanger, near said fuel cell stack, and said reformer and said evaporator are provided adjacent to each other.

4. A fuel cell system according to claim 1, wherein said fluid unit is provided symmetrically with respect to a central axis of said fuel cell stack.

5. A fuel cell system according to claim 1, further comprising a casing accommodating at least said fuel cell stack and said fluid unit, wherein the casing forms the outer wall of the dual wall structure; and a load applying mechanism for applying a tightening load to said fuel cell stack in a stacking direction, said load applying mechanism being provided at the opposite end of said fuel cell stack in the stacking direction, in said casing.

6. A fuel cell system according to claim 5, wherein said load applying mechanism is provided symmetrically with respect to a central axis of said fuel cell stack.

* * * * *